May 6, 1969 E. G. SULLIVAN 3,442,492
FLUID CURRENT MOTOR
Filed July 3, 1967
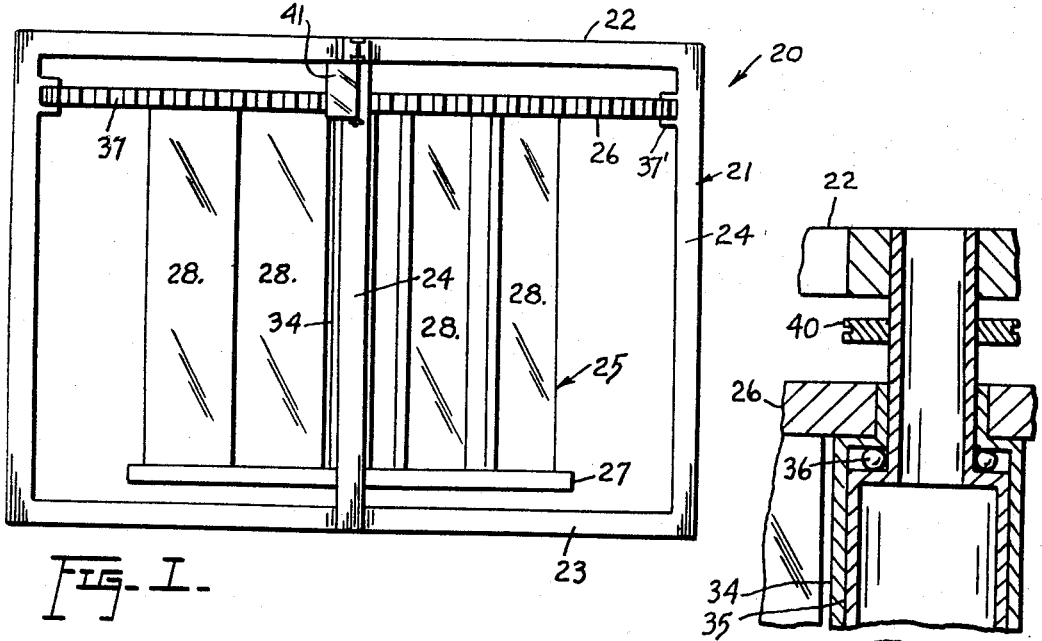
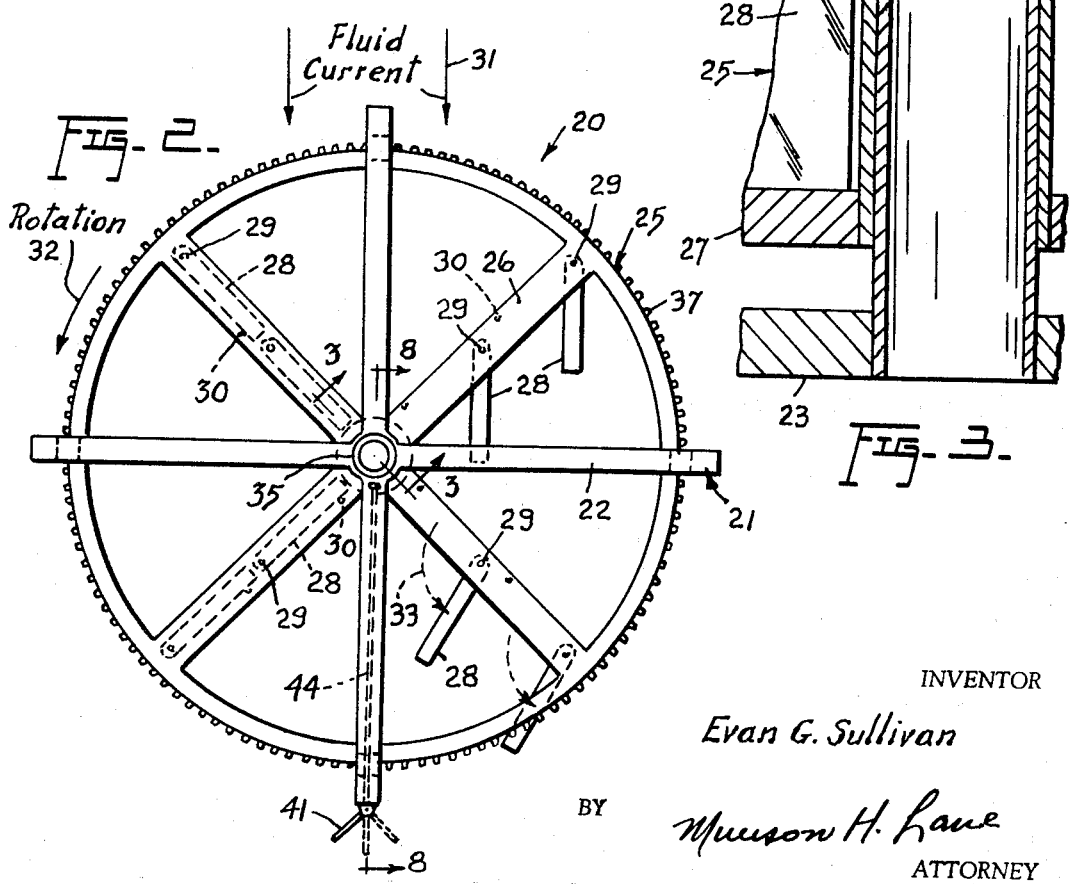
INVENTOR
Evan G. Sullivan
BY
Munson H. Lane
ATTORNEY

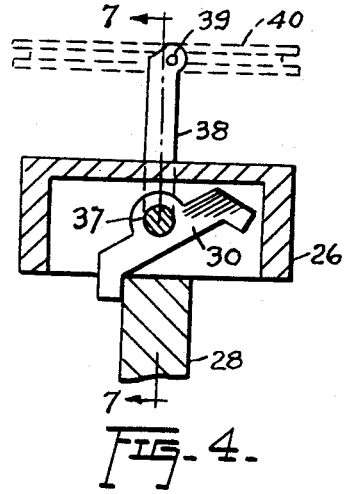
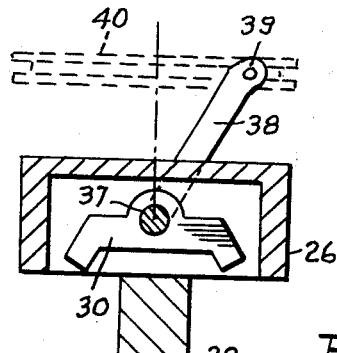
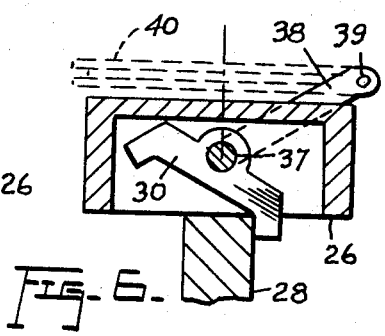
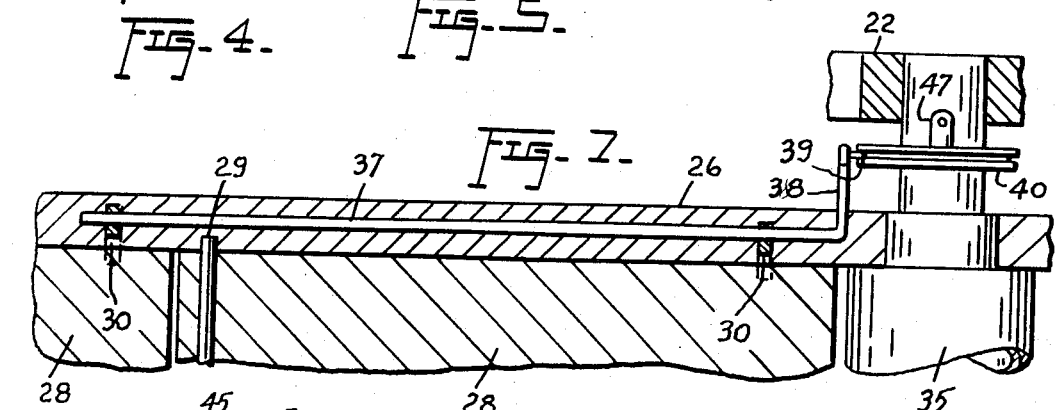
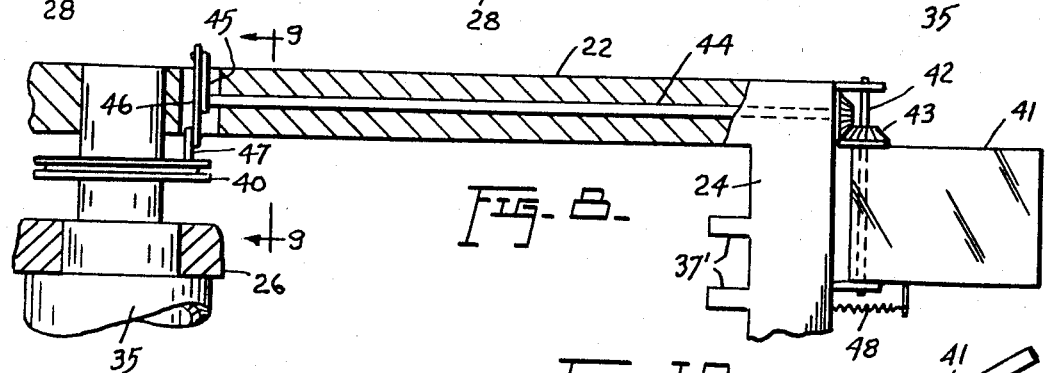
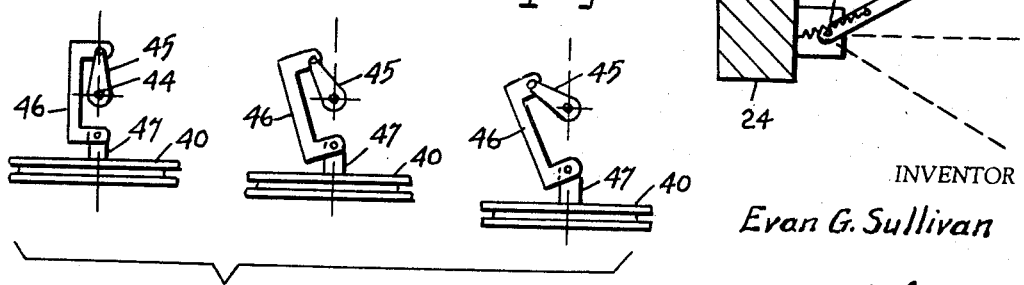

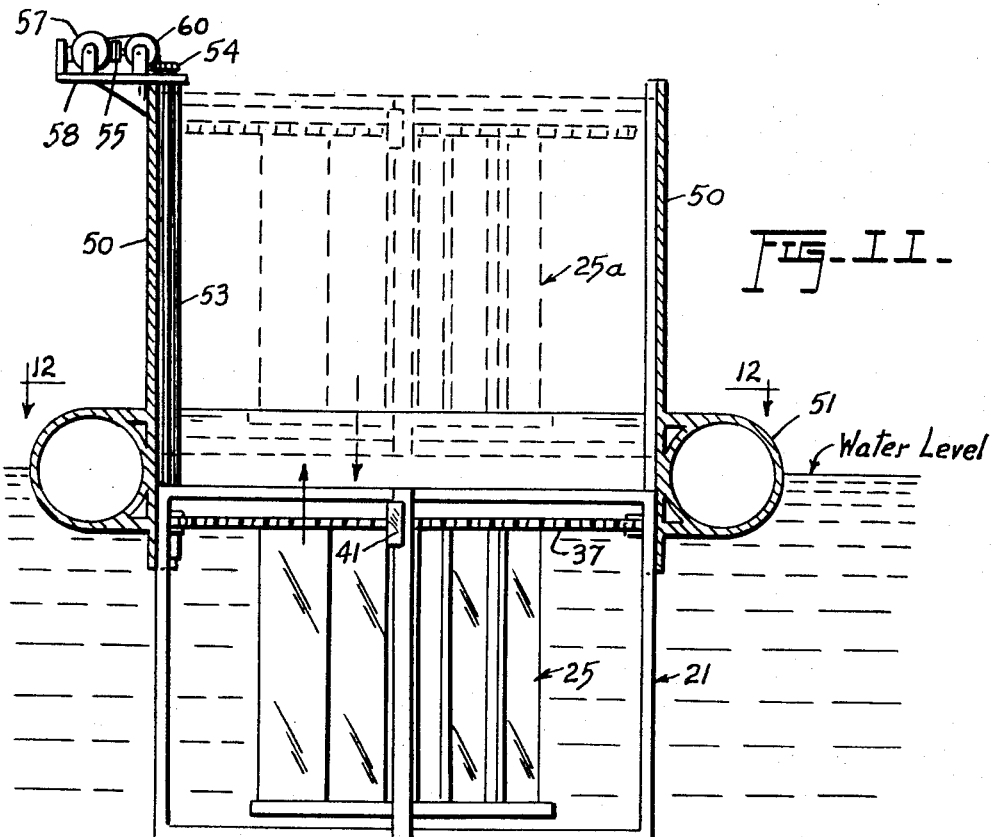
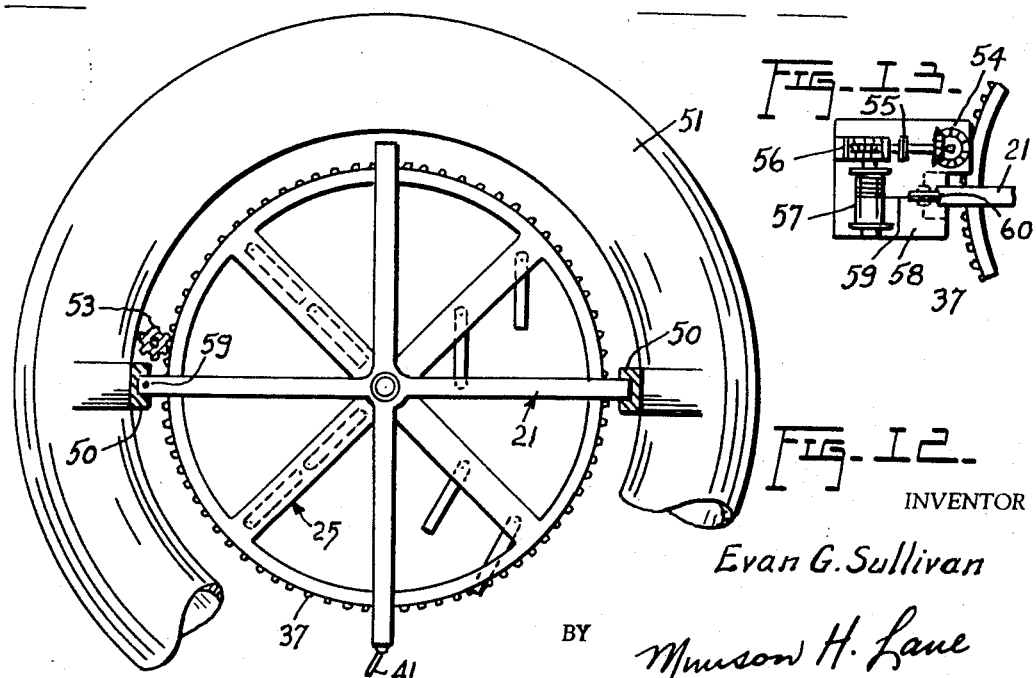

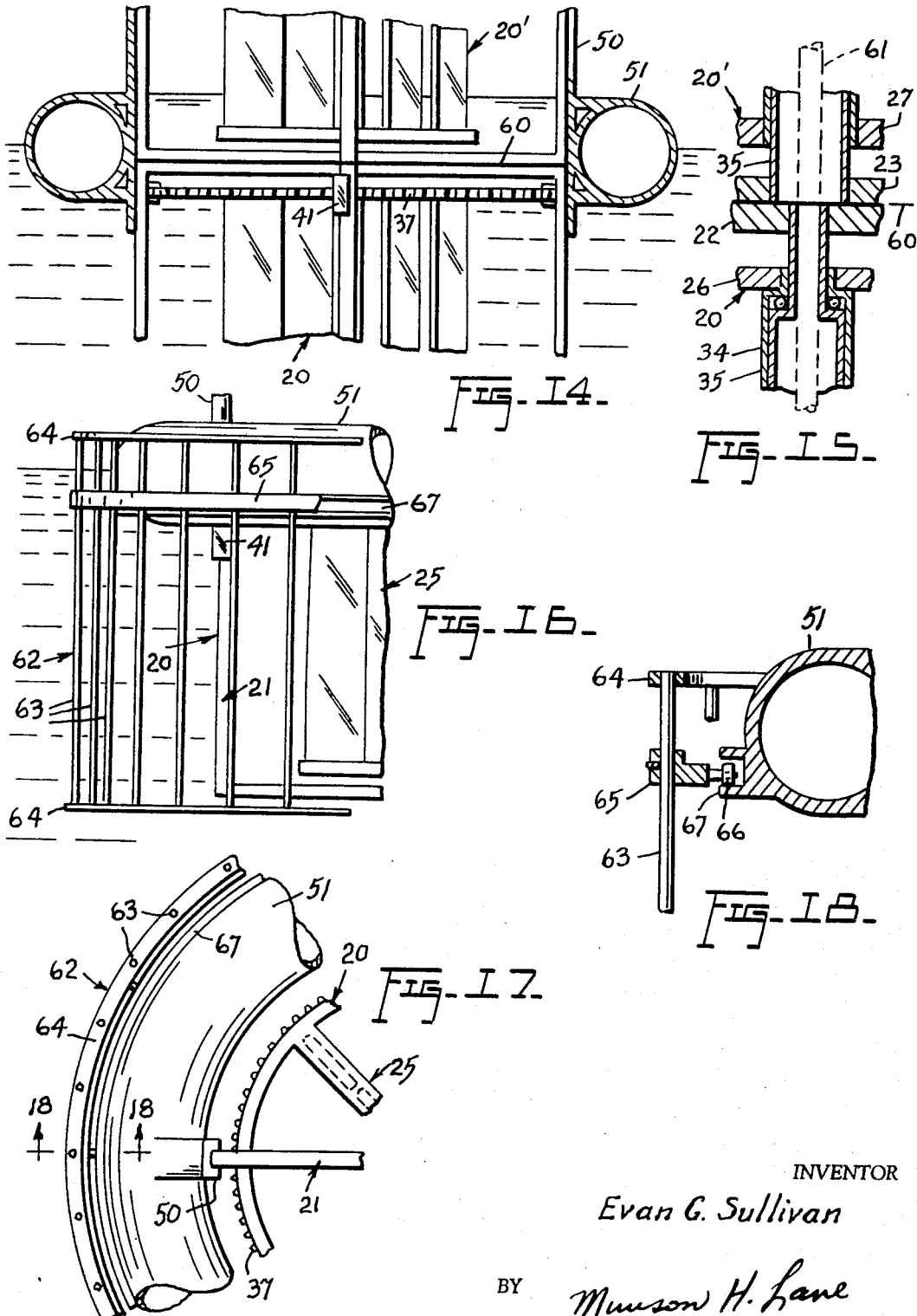

United States Patent Office 3,442,492
Patented May 6, 1969

3,442,492
FLUID CURRENT MOTOR
Evan G. Sullivan, Box 631, Point Comfort, Tex. 77978
Filed July 3, 1967, Ser. No. 650,972
Int. Cl. F03b *13/12*
U.S. Cl. 253—10
8 Claims

ABSTRACT OF THE DISCLOSURE

A drum rotatably mounted in a frame, the drum having pivoted panels to be acted upon by a current of fluid such as water or air, for imparting rotation to the drum. Abutment means engageable selectively with opposite sides of the panels facilitate rotation of the drum selectively in opposite directions, the abutment means also being disengageable from the panels by an excessive fluid current to arrest rotation of the drum. A buoyant member with vertical guides may slidably mount the frame so that the drum may be actuated either by water current or by air current, and an annular guard also supported by the buoyant member prevents obstruction of the drum by foreign objects. The drum has a hollow mounting shaft and a plurality of the devices may be stacked so that the shafts thereof provide a continuous passage therethrough.

---

This invention relates to new and useful improvements in fluid current motors for harnessing the energy of a current of water or air, the energy so harnessed being transformed into a rotational force at the power take-off of the motor. While fluid current motors of this general type are well known in the art, it is the principal object of the invention to provide a simple but highly efficient motor which may be used at sea or in the air for actuation by natural water or air flow regardless of its direction, and without the need for constructing dams, water falls, air ducts, or the like.

Another important object of the invention is to provide a motor which may be caused to rotate selectively in opposite directions regardless of the direction of the fluid current, and which may be stopped, either at will, or automatically to safeguard against damage when the strength of the fluid current becomes excessive.

Another important object of the invention is to provide a motor which is capable of floating on a body of water and which may be raised from below to above water level for selective actuation by either water or air currents.

Another object of the invention is to provide a self-cleaning guard for the motor to prevent obstruction thereof by foreign objects such as floating debris, large fish, birds, et cetera.

Another object of the invention is to provide a motor which may be used in multiples, that is, as a set of axially juxtaposed or stacked motors with common or individual power take-offs, if so desired.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIG. 1 is a side elevational view of a fluid current motor in accordance with the invention;

FIG. 2 is a top plan view thereof;

FIG. 3 is a fragmentary, enlarged sectional detail, taken substantially in the plane of the line 3—3 in FIG. 2;

FIG. 4 is a fragmentary, enlarged sectional detail showing the panel abutment means in engagement with one side of the panel;

FIG. 5 is a detail similar to that in FIG. 4 but showing the abutment means disengaged from the panel;

FIG. 6 is a detail similar to that in FIG. 4 but showing the abutment means in engagement with the opposite side of the panel;

FIG. 7 is a fragmentary sectional view, taken substantially in the plane of the line 7—7 in FIG. 4;

FIG. 8 is a fragmentary, enlarged sectional view, taken substantially in the plane of the line 8—8 in FIG. 2;

FIG. 9 is a group diagrammatic illustration showing the action of the linkage, as viewed in the plane of the line 9—9 in FIG. 8;

FIG. 10 is a fragmentary underside plan view of the control vane shown in the right-hand portion of FIG. 8;

FIG. 11 is a view, partly in vertical section and partly in elevation, showing the device of FIG. 1 equipped with a buoyant member for operation of the device either below or above water;

FIG. 12 is a fragmentary horizontal sectional view, taken substantially in the plane of the line 12—12 in FIG. 11;

FIG. 13 is a fragmentary plan view of the winch mechanism shown at the top of FIG. 11;

FIG. 14 is a view, partly in vertical section and partly in elevation, showing two of the devices in a stacked position;

FIG. 15 is a fragmentary, enlarged sectional detail showing the hollow shafts of the stacked devices;

FIG. 16 is a fragmentary side elevational view of the device of FIG. 11 equipped with a debris guard;

FIG. 17 is a fragmentary plan view of the subject shown in FIG. 16; and

FIG. 18 is a fragmentary, enlarged sectional detail, taken substantially in the plane of the line 18—18 in FIG. 17.

Referring now to the accompanying drawings in detail, more particularly to FIGS. 1–3 inclusive, the fluid current motor of the invention is designated generally by the reference numeral 20. The same comprises a supporting frame 21 including upper and lower frame portions 22, 23 connected by uprights 24. The frame 21 contains a rotatable drum 25, consisting of upper and lower drum members 26, 27 having a plurality of vertical panels 28 pivotally mounted therebetween, as at 29. The panels 28 are engageable by abutments 30 hereinafter described, so that the panels are substantially radial at one side of the drum as shown in FIG. 2, whereby water or air current moving, for example, in the direction of the arrows 31, exerts a force against the radial panels and thus imparts rotation to the drum as indicated by the arrow 32. However, on the opposite side of the drum the panels are free to swing away from the abutments 30 as indicated at 33, so that with the rotation of the drum the panels in this position can move against the fluid current with negligible resistance. It will be understood that rotation of the drum is produced regardless of the direction from which the fluid current may approach the drum.

The upper and lower members 26, 27 of the drum may be carried by a simple shaft rotatably journalled in the frame 21, although it is preferred that these drum members be secured to a tubular sleeve 34, rotatably mounted on a hollow, open-ended shaft 35, the upper and lower ends of the shaft being secured in the upper and lower portions 22, 23 of the frame 21, as shown in FIG. 3. Suitable anti-friction bearings 36 may be provided between the shaft and the sleeve, as shown. If the drum mounting shaft is a simple shaft, power take-off may be had directly from such a shaft. However, in the preferred arrangement the upper drum member 26 is equipped with an annular gear or ring gear 37 for power take-off purposes. The uprights 24 of the frame 21 may be provided with suitable guides 37' to stabilize the ring gear 37.

Referring now to FIGS. 4–10 in conjunction with FIGS. 1–3, it will be observed that the abutments 30 are carried by shafts 37 which are rotatably journalled in the upper member 26 of the drum 25, the inner end portions of the shafts 37 projecting upwardly from the member 26 and being angulated to provide cranks 38 equipped with pins 39 which project into an annular groove of an actuating disc 40. The latter is non-rotatably but slidably positioned on the drum shaft 35 and the arrangement is such that when the disc 40 is in its fully raised position, the abutments 30 engage the panels 28 at one side as shown in FIG. 4. When the disc is in its fully lowered position, the abutments engage the opposite side of the panels as shown in FIG. 6. Moreover, when the disc 40 is in intermediate its raised and lowered positions, the abutments are fully disengaged or retracted from the panels, as in FIG. 5. It will be appreciated from FIG. 2 that when the abutments engage the panels at one side, the action of the fluid current will cause rotation of the drum in one direction, for example the direction of the arrow 32, but when the abutments engage the panels on their opposite side, the dum will rotate in the opposite direction, regardless of the relative direction of the fluid current. Thus, by simply adjusting the abutments 30 by upward or downward sliding of the disc 40, the drum may be caused to rotate in either direction as desired, regardless of the current flow. Moreover, by sliding the disc 40 to its intermediate position wherein the abutments are fully disengaged from the panels, the panels are left free to align themselves with the direction of current, and no rotation will be imparted to the drum.

Sliding of the abutment actuating disc 40 on the shaft 35 is effected by a control vane 41 secured to a shaft 42 suitably journalled on one of the uprights 24 of the frame 21, the shaft 42 being connected by gearing 43 to a further shaft 44 which extends through the frame portion 22 toward the drum shaft 35. The shaft 44 carries a crank 45 pivotally connected by a link 46 to a lug 47 on the disc 40, as will be apparent from FIGS. 9 and 10.

The vane 41 is swingable in a horizontal plane to either side of a central position in which it is parallel to the direction of current, and a spring 48 is connected to the vane for biasing the same to either of its off-center positions, so that the vane remains either to the left or to the right of center, depending on how it is manually set. When the control vane 41 is set in one off center position, say to the left, the disc 40 is slid on the shaft 35 so as to engage the abutments 30 with one side of the panels 28 to effect rotation of the drum 25 in one direction. On the other hand, when the vane is set in the other off center position, the abutments engage the other side of the panels to effect rotation of the drum in the opposite direction. In the center position of the vane 41, the abutments are disengaged from the panels so that no rotation is imparted to the drum. The vane may be held in the central position at will, either manually or mechanically, when rotation of the drum is not desired. However, as an automatic safety measure, the vane is forced to its central position whenever the strength of current is sufficient to overcome the bias of the spring 48, so that in the presence of excessively strong currents rotation of the drum is automatically arrested to safeguard against possible damage to the drum.

The supporting frame 21 may be suitably mounted so that the drum 25 is immersed in a body of water to effect rotation of the drum by water current. Alternatively, the frame may be mounted above water or on land so that the drum is rotated by wind. However, in the preferred arrangement the frame 21, with the drum 25 contained therein, is slidably mounted in vertical guides 50 supported by an annular buoyant member 51 which floats on a body of water as shown in FIGS. 11, 14 and 16. With particular reference to FIG. 11, it will be observed that the frame 21 may be slid along the guides 50 from a lowered position wherein the drum 25 is immersed in water for rotation by water current, to a raised position above the water level as indicated at 25a, wherein the drum is rotated by air current. Suitable means may be utilized for raising and lowering the frame with its drum and, if desired, such means may be motivated by the power take-off of the motor itself. For example, as shown in FIGS. 11–13, a splined vertical shaft 53 may be rotatably positioned adjacent one of the guides 50, to be rotated by the ring gear 37 which is vertically slidable along the shaft 53 as the frame with its drum are raised or lowered. The upper end of the shaft 53 is connected by gearing 54, a clutch 55 and further gearing 56 to a winch 57 mounted on a platform 58 at the upper end of the adjacent guide 50. A cable 59 extends from the winch 57 to the frame 21 over a guide pulley 60, so that when the shaft 53 is rotated in one direction by the ring gear 37, the winch 57 causes the frame 21 with the drum 25 to slide upwardly along the guides 50 to raise the drum from below to above the water line. Conversely, rotation of the drum 25 and ring gear 37 may be reversed as already described, so that the cable 59 is paid out from the winch 57 for lowering the drum into water. The clutch 55 permits the drive to the winch to be disengaged, when raising or lowering of the drum is not desired.

FIGS. 14 and 15 illustrate another arrangement which is similar to that in FIGS. 11–13, except that instead of lowering and raising the frame 21 and drum 25 into and out of water, the frame and drum remains in its lowered, water-immersed position, and another motor, identical to that already described, is superposed or stacked axially on top of the motor 20, as indicated at 20'. This is facilitated by simply inserting the frames 21 of both motors in the guides 50, and in such an arrangement the lower motor may be operated by water current while the upper motor is operated by wind. Moreover, if desired, the guides 50 may be of any suitable length to accommodate any desired number of axially stacked motors, for either above or below water operation, or a combination of both, and either with or without relying upon the buoyant member 51 for sustenance of floatation.

It may be also mentioned at this point that while the buoyant member 51 is preferably provided to sustain floatation of the device, such a buoyant member may not be necessary if the frame and drum of the device are made of lighter-than-water material, as wood for example, in which event the device would possess inherent buoyancy.

In any event, referring again to the stacked arrangement of two or more motors as in FIGS. 14 and 15, in such an arrangement the hollow, open-ended shafts 35 of the motors 20, 20', et cetera, will be in axial alignment and abutment, as for example at the line or plane 60, and will afford therethrough a continuous passage for reception of equipment such as a drill string 61 for use in off-shore drilling for oil, for example. In such event the drill string may be conveniently rotated by power take-off from the motors of the invention.

Finally, with reference to FIGS. 16–18, it may be desirable to safeguard the rotating drum of the motor from possible obstruction by foreign objects such as debris floating in water, large fish, or large birds in the air. For this purpose an annular guard or cage 62 is provided to surround the motor 20, the cage consisting of vertical rods 63 secured to upper and lower rings 64, with intermediate portions of the rods passing through a supporting annulus 65. The latter is provided at its inner periphery with a set of rollers 66 movable along an annular track 67 carried by the buoyant member 51, so that the entire cage 62 is capable of rotation around the motor 20. If an obstruction should come in contact with the cage, it will be prevented from coming in contact with the drum of the motor, thus safeguarding against the danger of obstruction.

Moreover, the rotatable mounting of the cage will enable the cage to turn by the force of current against the obstruction on the cage, and when the cage has turned to a point where the obstruction is downstream on the cage, the obstruction will be automatically washed away by the current, thus rendering the cage self-clearing.

The rods or bars 63 of the cage 62 preferably are vertically slidable in the annulus 65 so that the cage may be raised or lowered as required by the position of the motor protected thereby, and suitable means may be employed for locking the cage in an adjusted position, as for example, set screws 68 in the annulus 65 gripping one or more of the rods 63.

What is claimed as new is:

1. A fluid current motor, comprising in combination a supporting frame, a drum rotatably mounted in said frame, said drum including a plurality of pivotally mounted panels swingable between an active position wherein a current of fluid acting thereon may impart rotation to the drum and a passive position wherein the panels may move against the fluid current with negligible resistance, abutment means carried by said drum and engaged by said panels in their active position, and power take-off means from said drum together with a buoyant member floating on a body of water, vertical guides carried by said buoyant member, said frame being slidable along said guides whereby said drum may be disposed selectively below and above the water level for actuation of said panels by water current and air current respectively, an annular guard surrounding said drum, and means mounting said guard on said buoyant member for raising and lowering movement of the guard.

2. The device as defined in claim 1 together with means adjustably mounting said abutment means on said drum for selective engagement of the abutment means with opposite sides of said panels, whereby the fluid current may selectively rotate the drum in opposite directions.

3. The device as defined in claim 1 together with means adjustably mounting said abutment means on said drum for disengagement of the abutment means from all the panels, whereby all panels may assume a passive position to prevent rotation of the drum by the fluid current.

4. The device as defined in claim 3 together with means responsive to excessive fluid current for automatically disengaging said abutment means from all the panels.

5. The device as defined in claim 1 together with means adjustably mounting said abutment means on said drum whereby the abutment means may selectively engage opposite sides of the panels in their active position and whereby the abutment means may be selectively disengaged from all the panels so that the same may assume a passive position, and control means provided on said frame and operatively connected to said adjustable mounting means of said abutment means for actuating the same.

6. The device as defined in claim 5 wherein said control means include a vane pivotally mounted on said frame for movement from a central position wherein it is parallel to the current flow selectively to opposite sides of the central position wherein it is exposed to current pressure, said abutment means being disengaged from said panels when said vane is in its central position but engaging the respective opposite sides of the panels when the vane is at the respective opposite sides of the central position, and resilient means biasing said vane selectively to opposite sides of the central position in the absence of excessive current pressure to hold the vane centrally.

7. The device as defined in claim 1 wherein said guard mounting means include means for facilitating rotation of the guard relative to said buoyant member.

8. The device as defined in claim 1 wherein said drum includes a hollow and open-ended shaft rotatably mounting the drum in said frame.

References Cited

UNITED STATES PATENTS

| 1,047,274 | 12/1912 | Murdock | 170—120 |
| 1,077,318 | 11/1913 | Symmonds | 103—60 X |
| 1,111,350 | 9/1914 | Bayley | 170—121 |
| 1,314,232 | 8/1919 | Wohr | 170—11 X |
| 1,465,593 | 8/1923 | Barrett et al. | 170—25 |
| 1,882,961 | 10/1932 | Saunders | 170—148 X |

FOREIGN PATENTS

| 1,133,415 | 11/1956 | France. |
| 478,537 | 6/1929 | Germany. |

EVERETTE A. POWELL, JR., *Primary Examiner.*

U.S. Cl. X.R.

230—59; 103—59; 170—146